US012443172B2

(12) United States Patent
Mazur et al.

(10) Patent No.: US 12,443,172 B2
(45) Date of Patent: Oct. 14, 2025

(54) CONTAINER REGISTRY AND SUBSCRIPTION SERVICE FOR INDUSTRIAL SYSTEMS

(71) Applicant: Rockwell Automation Technologies, Inc., Mayfield Heights, OH (US)

(72) Inventors: David C. Mazur, Mequon, WI (US); Rob A. Entzminger, Shawnee, KS (US); Ryan Coon, Franklin, WI (US); Bruce T. McCleave, Jr., Mission Viejo, CA (US); James M. Teal, New Brunswick, NJ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 33 days.

(21) Appl. No.: 18/614,105

(22) Filed: Mar. 22, 2024

(65) Prior Publication Data

US 2024/0255929 A1    Aug. 1, 2024

Related U.S. Application Data

(63) Continuation of application No. 17/947,892, filed on Sep. 19, 2022, now Pat. No. 11,947,342.

(51) Int. Cl.
*G05B 19/418* (2006.01)
*G06T 7/00* (2017.01)

(52) U.S. Cl.
CPC ..... *G05B 19/4185* (2013.01); *G05B 19/4188* (2013.01); *G06T 7/0004* (2013.01)

(58) Field of Classification Search
CPC ............ G05B 19/4185; G05B 19/4188; G06T 7/0004; G06F 8/63; G06F 8/71;
(Continued)

(56) References Cited

U.S. PATENT DOCUMENTS 10,715,388 B2    7/2020    Fildebrandt et al.
11,182,206 B2    11/2021    Jung et al.
(Continued)

FOREIGN PATENT DOCUMENTS

| EP | 3798877 A1 | 3/2021 |
| KR | 20200027783 A | 3/2020 |
| WO | 2020184362 A1 | 9/2020 |

OTHER PUBLICATIONS

Goldschmidt et al. "Software Containers for Industrial Control" from "2016 42th Euromicro Conference on Software Engineering and Advanced Applications" (Year: 2016).*

(Continued)

*Primary Examiner* — Yuhui R Pan
(74) *Attorney, Agent, or Firm* — Fletcher Yoder, P.C.

(57) ABSTRACT

A method may involve receiving, via at least one processor, a request from an industrial component operating in an industrial automation system, such that the request may include an indication of a software function. The method may then involve querying a container registry having a plurality of container images based on the software function, identifying at least one container image of the plurality of container images that corresponds to the software function, sending an indication of the at least one container image to the industrial component, and receiving a selection of the at least one container image from the industrial component. The method may also involve retrieving the at least one container image from the container registry and sending the at least one container image to the industrial component.

20 Claims, 5 Drawing Sheets

(58) Field of Classification Search
CPC ... G06F 2009/45562; G06F 2009/4557; G06F 9/45558
See application file for complete search history.

(56) References Cited

U.S. PATENT DOCUMENTS

| | | | |
|---|---|---|---|
| 11,474,873 | B2 | 10/2022 | Biernat et al. |
| 11,513,877 | B2 | 11/2022 | Biernat et al. |
| 2006/0122987 | A1* | 6/2006 | Angelo ............... G06F 16/958 |
| 2017/0177860 | A1* | 6/2017 | Suarez ................ G06F 21/53 |
| 2018/0024537 | A1 | 1/2018 | Chauvet et al. |
| 2018/0054469 | A1 | 2/2018 | Simoncelli |
| 2019/0377604 | A1 | 12/2019 | Cybulski |
| 2020/0136906 | A1 | 4/2020 | Bernat et al. |
| 2020/0249928 | A1 | 8/2020 | Zeng et al. |
| 2020/0278892 | A1 | 9/2020 | Nainar et al. |
| 2020/0311617 | A1 | 10/2020 | Swan et al. |
| 2021/0084048 | A1 | 3/2021 | Kannan et al. |
| 2021/0089354 | A1 | 3/2021 | Nixon et al. |
| 2021/0200814 | A1* | 7/2021 | Tal .................... G06F 16/90335 |
| 2021/0218617 | A1 | 7/2021 | Palavalli et al. |
| 2021/0294624 | A1* | 9/2021 | Gray .................... G06F 8/654 |
| 2021/0382727 | A1 | 12/2021 | Vigil et al. |
| 2022/0027721 | A1 | 1/2022 | Thoemmes et al. |
| 2022/0091572 | A1 | 3/2022 | Biernat et al. |
| 2022/0179398 | A1 | 6/2022 | Putman et al. |
| 2022/0391259 | A1 | 12/2022 | Biernat et al. |

OTHER PUBLICATIONS

Extended European Search Report for European Patent Application No. 21179775.8, dated Nov. 25, 2021, 9 pages.
Partial European Search Report for European Patent Application No. 21180068.5, dated Dec. 8, 2021, 17 pages.
Marshall, "Industry 4.0: The PLC evolves from Controller to Cloud Interface," Feb. 9, 2018, https://www.rs-online.com/designspark/evolution-of-the-industrial-plcfrom-controller-to-cloud-interface, retrieved on Nov. 29, 2021, pp. 1-6.
European Search Report for European Patent Application No. 21180068.5, dated Mar. 28, 2022, 19 Pages.
Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.
European Search Report for European Patent Application No. 21180279.8, dated Apr. 19, 2022, 12 Pages.
D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).
A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).
Goldschmidt et al., "Software Containers for Industrial Control," 2016 42nd Euromicro Conference on Software Engineering and Advanced Applications, Aug. 31, 2016, 8 pages.
Liu, Y. et al., "A Data-Centric Internet of Things Framework Based on Azure Cloud," IEEE Access, vol. 7, Mar. 27, 2019, 20 pages.

* cited by examiner

CONTAINER REGISTRY AND SUBSCRIPTION SERVICE FOR INDUSTRIAL SYSTEMS

CROSS REFERENCE TO RELATED APPLICATIONS

This application is a continuation of U.S. patent application Ser. No. 17/947,892, entitled "CONTAINER REGISTRY AND SUBSCRIPTION SERVICE FOR INDUSTRIAL SYSTEMS" filed Sep. 19, 2022, that is incorporated herein by reference in the entirety.

BACKGROUND

This disclosure relates generally to systems and methods for implementing a container orchestration system in an operational technology (OT) or an industrial platform. More particularly, embodiments of the present disclosure are related to systems and methods for leveraging container orchestration systems to coordinate operations of OT devices.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operate in the OT environment are used to control industrial devices accessible via an OT network. Although the industrial control systems may be used to manage the operations of the devices within the OT network, improved systems and methods for operating devices within the OT network are desirable. For example, certain technologies available in the information technology (IT) environment may provide certain industrial control system users additional management tools that they employ for operating their IT assets.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include a first container registry that stores one or more container images and a first computing device. The first computing device may receive a request from an industrial component operating in an industrial automation system, wherein the request includes an indication of a requested software function. The first computing device may query the first container registry based on the requested software function and, during the query, may identify a first container image of the one or more container images that corresponds to the requested software function. The first computing device may retrieve the first container image from the first container registry and may send the first container image to the industrial component.

In another embodiment, a method may involve receiving, via at least one processor, a request from an industrial component operating in an industrial automation system, where the request may include an indication of a software function. The method may then involve querying a container registry based on the software function, where the container registry includes container images. The method may include identifying at least one container image of the container images that corresponds to the software function, sending an indication of the at least one container image to the industrial component, and receiving a selection of the at least one container image from the industrial component. The method may also involve retrieving the at least one container image from the container registry and sending the at least one container image to the industrial component.

In yet another embodiment, a tangible, non-transitory, computer-readable medium may include computer-executable instructions that, when executed by a processor, cause a device to perform operations including receiving a request from an industrial component operating in an industrial automation system, where the request may include an indication of a software function. The operations may then involve querying a container registry based on the software function, where the container registry includes container images. The operations may include identifying at least one container image of the container images that corresponds to the software function, sending an indication of the at least one container image to the industrial component, and receiving a selection of the at least one container image from the industrial component. The operations may also involve retrieving the at least one container image from the container registry and sending the at least one container image to the industrial component.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
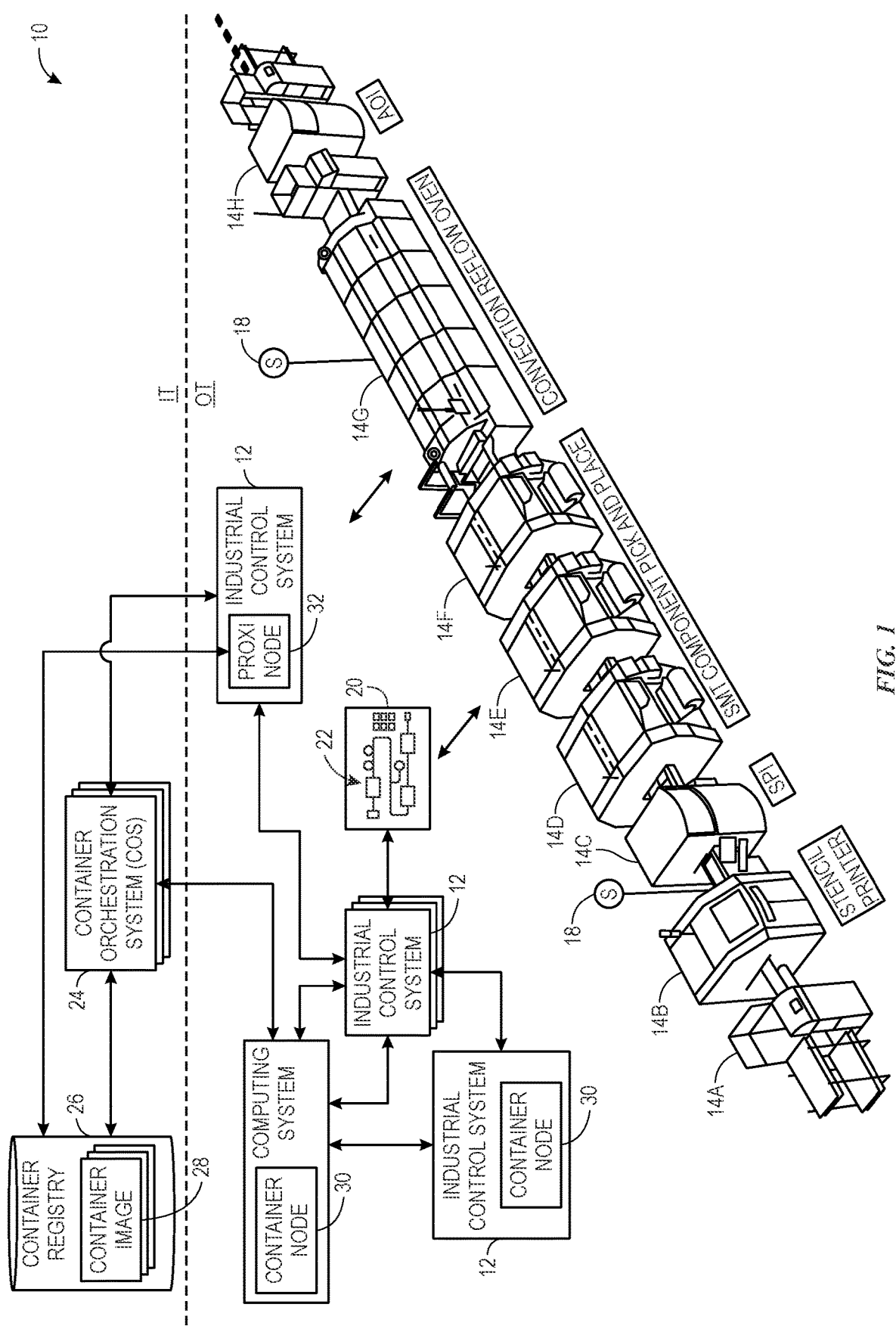
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed to coordinating operations of devices that are part of an operation technology (OT) system using information technology (IT) systems. As mentioned above, industrial control systems may be used to control and manage operations of devices that are part of the OT system. However, operators of these industrial automation systems may benefit from managing assets, such as programmable logic controllers (PLCs), that are part of the OT network using similar processes provided by information technology systems. By way of example, container orchestration systems may be used in IT systems to manage IT assets. That is, certain IT systems may leverage software containers (e.g., operating system level virtualization) in conjunction with container orchestration systems (e.g., Docker, Kubernetes) to coordinate the construction and deployment of various containers across a number of computing resources. Indeed, containers may include standard units of software that packages code and its dependencies, such that a container node may execute the application stored in the container regardless of the computing environment or infrastructure. As a result, multiple containers can run on the same machine and share an operating system kernel with other containers, such that each container is running as an isolated process in the respective machine. In this way, container orchestration systems that operate in the IT environment build application services operate across multiple computing resources, such that certain applications (e.g., packaged as software containers) may be automatically deployed, scaled, and managed in the same machine or across multiple machines in disparate computing environments.

With this in mind, using container orchestration systems to manage the operations of OT assets may realize many advantages including large scale application deployment, providing updates from managed registries, providing high availability using standby and backup container replicas in different OT assets, and the like. However, OT assets may not be accessible to container orchestration systems, which rely on certain operating systems that are distinct from the operating systems that control the OT assets. Instead, OT assets may be individually programmed and managed by a respective design tool operating in the OT space. For many industrial applications, particularly in the process automation space, a distributed industrial control system may provide multiple remote-control nodes that may access or interface with these OT assets via an OT network. However, the container orchestration systems are not capable to access the remote-control nodes via this OT network to manage these distributed OT assets in the same way they manage their networked IT assets in terms of provisioning, deploying, operating and maintaining the assets throughout their respective lifecycles.

Keeping the foregoing in mind, in certain embodiments, specialized hardware and/or software control systems may be integrated into industrial control systems that operate in the OT space, such that the control systems native to the OT assets may participate in orchestration operations. For example, in one embodiment, the control system may be configured as a worker node that may support a limited number of operations or commands provided by the container orchestration system. That is, the worker node may include an application programming interface (API) that supports receiving certain communications from a master node of the container orchestration system, parsing the communications to determine the requested commands, mapping the requested commands to OT asset commands, and sending the OT asset commands to the respective OT asset. These orchestration operations and other processing operations may be performed based on container images stored in a container registry.

It may be desirable to add or remove container images from the container registry over time. For example, it may be desired for the industrial control systems that operate in the OT space and/or in the IT space to communicate with a container storefront to purchase and subscribe to services for receiving one or more container images not yet stored in the container registry. In some cases, the industrial control systems may instruct the master container node to obtain a container image not yet stored in the container registry. However, in some cases, the master container node may indicate a desired software function to be performed by one or more container images and may coordinate with the container storefront to determine which of several container images stored in a storefront container register to download and deploy on the industrial automation system. Additional details with regard to coordinating the operations of the container orchestration system with industrial control systems that control OT assets will be discussed below with reference to FIGS. 1-4B.

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling of containers, provisioning and deployments of containers, determining availability of containers, configuring applications in terms of the containers that they run in, scaling of containers to equally balance application workloads across an infrastructure, allocating resources between containers, performing load balancing, traffic routing and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective file system to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
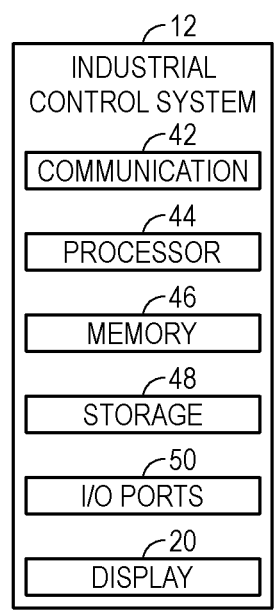
FIG. 2 is a block diagram of an example industrial control system corresponding to the example industrial automation system of FIG. 1, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
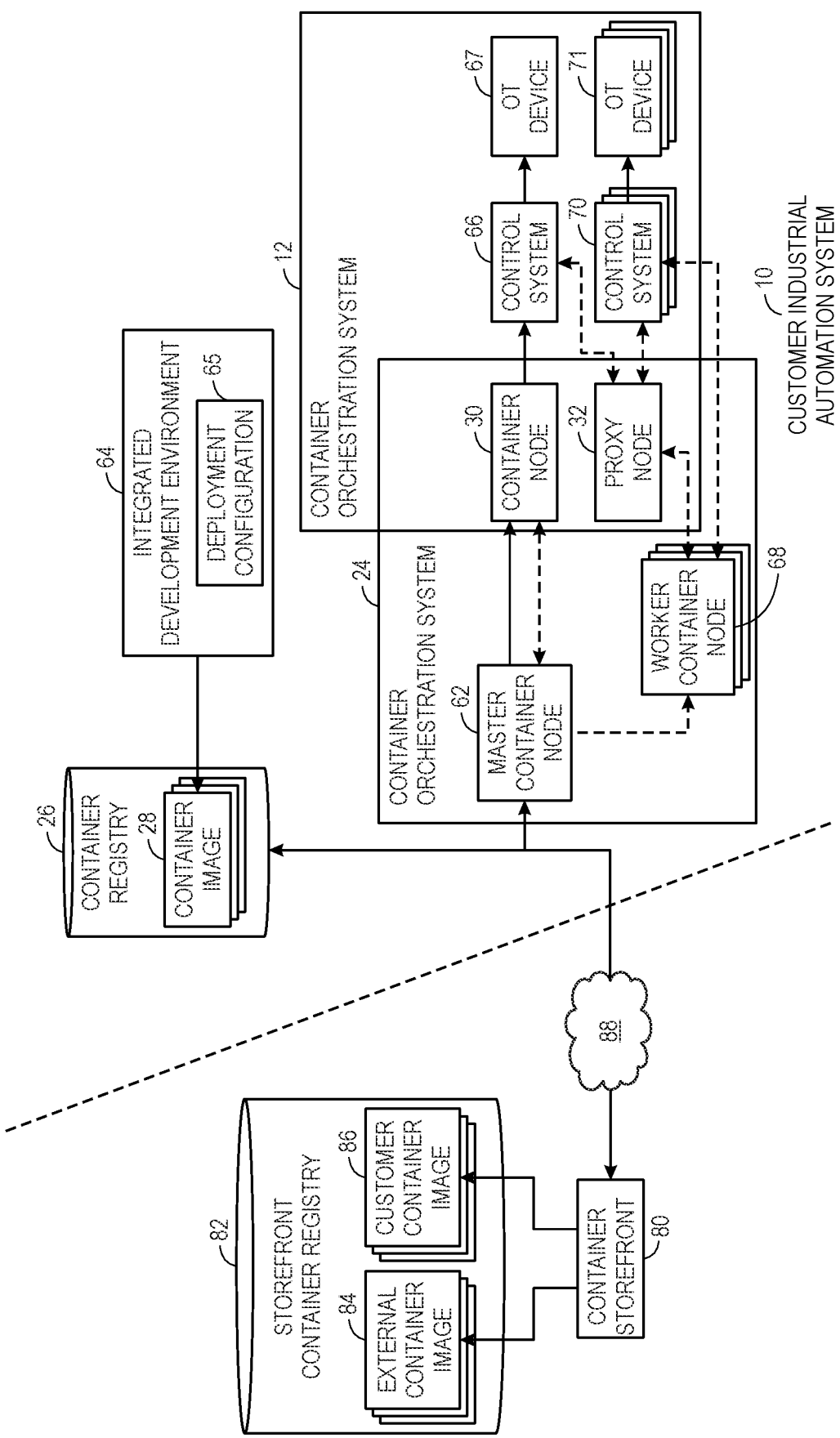
FIG. 3 is a block diagram of an example operational technology (OT) network of the industrial control system of FIG. 2 that coordinates with a container storefront, in accordance with an embodiment.

With the foregoing in mind, FIG. 3 illustrates a block diagram that depicts the relative positions of the container node 30 and the proxy node 32 with respect to the container orchestration system 24, as well as a container storefront 80 and a storefront container registry 82. As mentioned above, the container orchestration system 24 may include a collection of nodes that are used to achieve a desired state of one or more containers across multiple nodes. As shown in FIG. 3, the container orchestration system 24 may include a master container node 62 that may execute control plane processes for the container orchestration system 24. The control plane processes may include the processes that enable the container orchestration system 24 to coordinate operations of the container nodes 30 to meet the desired states. As such, the master node may execute an applications programming interface (API) for the container orchestration system 24, a scheduler component, core resources controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the host container nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk Live Data, EtherNet/IP, Common Industrial Protocol (CIP), OPC Direct Access (e.g., machine to machine communication protocol for industrial automation developed by the OPC Foundation), or any suitable OT communication protocol (e.g. DNP3, Modbus, Profibus, LonWorks, DALI, BACnet, KNX, EnOcean). Since the industrial control systems 12 operate in the OT space, the industrial control systems are not capable of implementing commands received via the container orchestration system 24.

In certain embodiments, the container node 30 may be programmed or implemented in the industrial control system 12 to serve as a node agent that can register the industrial control system 12 with the master container node 62. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial automation system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

The proxy node 32 may perform certain supervisory operations based on its analysis of the machine state data of the respective control system 66. As a result of its analysis, the proxy node 32 may issue commands and/or pods to other nodes that are part of the container orchestration system 24. For example, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

In the present embodiments described herein, the control system 66 may perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestrations system 24 and the OT-based industrial control system 12.

Sometimes it may be desired to deploy a container in the industrial automation system 10 with program content that has been generated by a computing system disposed outside the OT space and the IT space of the industrial automation system 10. For example, it may be desirable to have the flexibility to deploy a container developed by the industrial automation system 10 (e.g., a customer industrial automation system), a container developed by a third party, by another customer industrial automation system, by a vendor that manufactured an industrial automation component (e.g., OT device 67, 71, IT device (not illustrated)), or the like. Containers like these may be broadly grouped into two categories (though other categories may be used), such as containers made by third parties or by a vendor that manufactured an industrial automation component may be considered external container images 84. Containers associated with other customer industrial automation systems may be considered customer container images 86. Containers developed by the industrial automation system 10 may be considered the container images 28.

Similar to the container registry 26, the storefront container registry 82 may be any suitable data storage or database that may be accessible to the container storefront 80. The external container images 84 and the customer container images 86 may correspond to executable software packages that include the tools and data employed to execute a respective application. That is, external container images 84 and the customer container images 86 may include related code for operating the application, application libraries, system libraries, runtime tools, default values for various settings, and the like.

The customer container images 86 may not be mutually exclusive from the container images 28. Indeed, the master container node 62 may coordinate with the container storefront 80 to backup and/or store one or more of the container images 28 as part of the customer container images 86. Doing so may improve industrial automation system 10 operations by enabling a respective master container node 62 to deploy a selected customer container image 86 without having to replicate development processes, thereby saving time and conserving computing resources that may have been dedicated to developing that software function in an IDE tool 64.

To elaborate, the industrial automation system 10 may be considered a customer of a container storefront 80. The container storefront 80 may correspond to a digitally-implemented or virtually-implemented storefront, where container images 84, 86 are able to be purchased, subscribed to, and downloaded based an exchange of communication signals and/or data signals between the master container node 62 and the container storefront 80. The master container node 62 may communicate with the container storefront 80 via an electronic interface of the digital storefront. In this way, the digital storefront managed by the container storefront 80 may be a software-enabled digital interface and/or application from which the master container node 62 may instruct a query and/or otherwise obtain a container image for installation on the customer industrial automation system 10. The master container node 62 may communicate with the container storefront 80 via a connection, such as a wireless or cloud connection 88. In this way, the container storefront 80 and/or the storefront container registry 82 may be disposed remote from and external to the customer industrial automation system 10.

The master container node 62 may determine which of the external container images 84 and/or customer container images 86 to select and download. In some cases, the master container node 62 may select the container images based on a selection input to the IDE tool 64 and/or a component of the customer industrial automation system 10.

Once the master container node 62 selects one or more of the container images, the selected container image may be stored in the container registry 26 with the other container images 28. The master container node 62 may deploy the selected container image to the customer industrial automation system 10 and use the deployed container image to process data associated with the OT devices 67, 71, in accordance with methods described above.

To enable automatic updates to the downloaded container, the master container node 62 may subscribe to the selected container image. The container storefront 80 (e.g., container storefront 80 device) may manage the subscriptions based on indications of the subscriptions stored in the storefront container registry 82. Once subscribed, changes made to a corresponding container image 84, 86, 28 may be automatically deployed to the corresponding storefront container registry 82 and/or the container registry 26. When used to update a stored container image 28, the master container node 62 may detect the change to the container images 28 and deploy the update to the associated deployed container. In some systems, the deployment of the updated container images may occur based on a periodic update schedule or other managed timeline to coordinate a timing of the update operations.

Figure 4A:
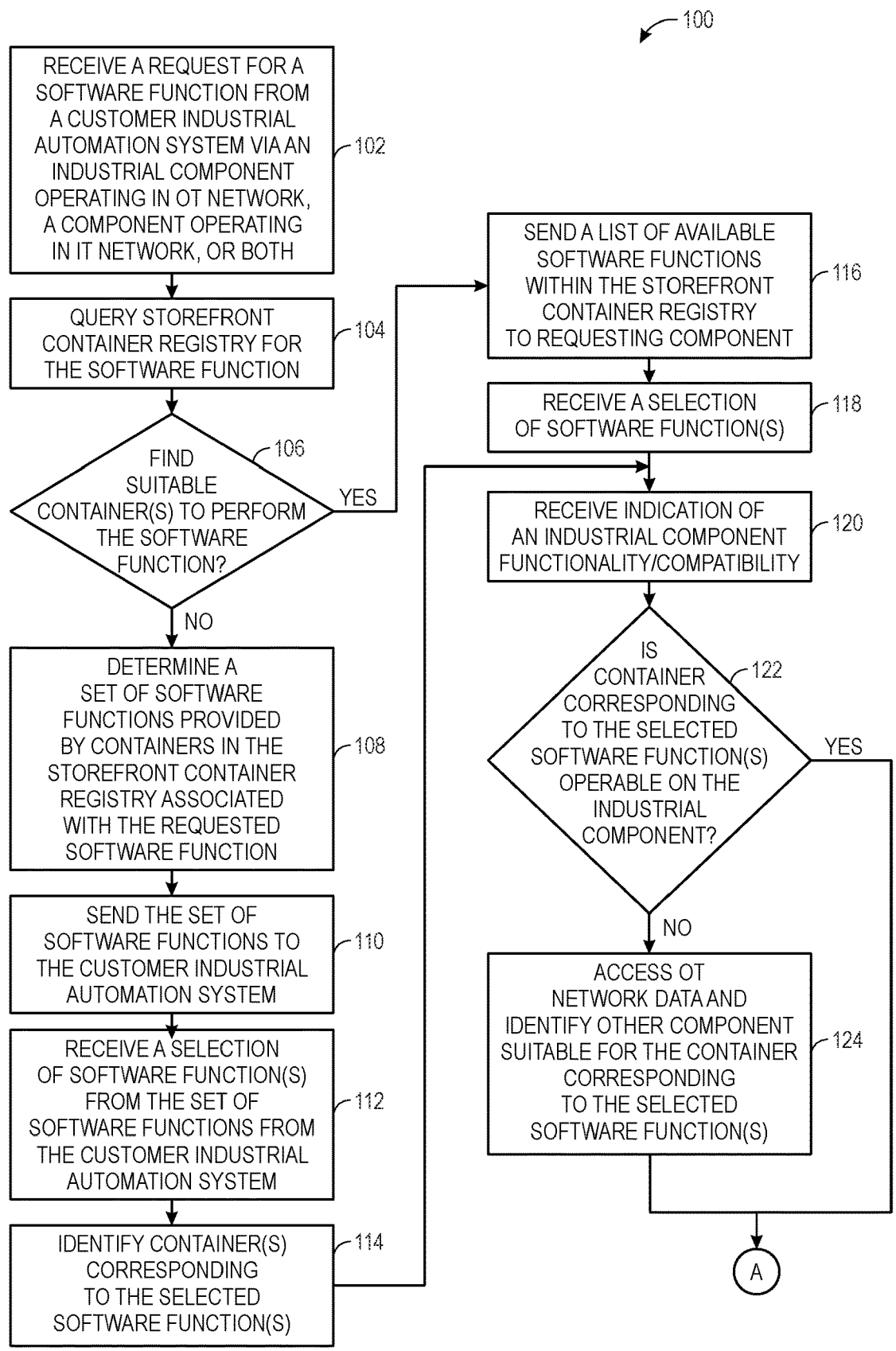
FIG. 4A and FIG. 4B are a flow diagram of a process for operating the container storefront device of FIG. 3 to transmit selected container images to the industrial automation system of FIG. 3, in accordance with an embodiment.
Figure 4B:
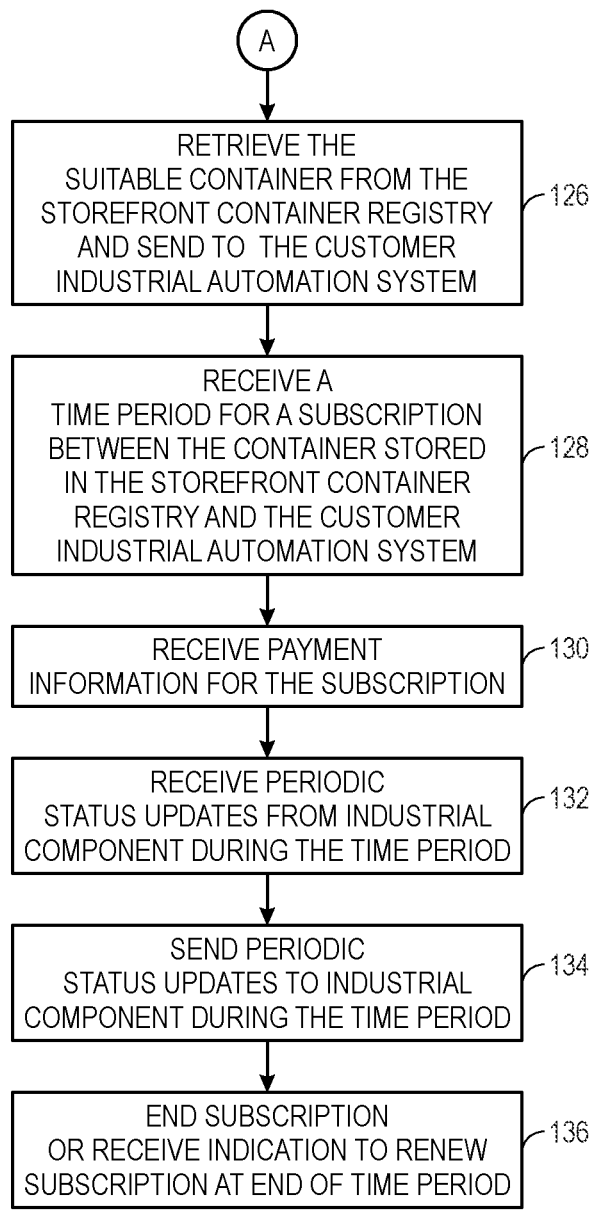

FIG. 4A and FIG. 4B are a flowcharts of different portions of a method 100 in which the container storefront 80 may implement to coordinate and implement requests for container images and subscriptions to the container images. FIG. 4A and FIG. 4B are referred to together herein for ease of description. Although the following description of the method 100 is described as being performed by the container storefront 80, it should be understood that any suitable container image management system that is configured to interface with the storefront container registry 82 and the industrial control system 12 may perform the operations described herein. In addition, although the method 100 is described in particular order, it should be understood that the method 100 may be performed in any suitable order.

At block 102, the container storefront 80 may receive a request for a software function from a customer industrial automation system 10 via an industrial component (e.g., OT device 67, 71) operating in an OT space and/or a component operating in an IT space. The request for the software function may specifically indicate a particular container to be selected and downloaded via the container storefront 80. In some cases, the request for the software function may indicate generally a technical problem or a general description of a processing function that a container application is desired to resolve or perform. For example, the container storefront 80 may receive a request indicating that the software function of "averaging two or more values together" is desired or a software function that enables monitoring a power consumption peak on a respective OT device. Any suitable description may be used as the request, just so long that the container storefront 80 is able to process the description of the request. Any suitable component may receive the request to transmit the request to the container storefront 80. For example, a graphical user interface on the display 20 of a motor control system may be used to access the container storefront 80. As another example, a graphical user interface of a computing device disposed away from the display 20 may be used to communicate with the container storefront 80. A graphical user interface may also not be used, such as may be the case if a component has a button that may receive an input selection that instructs download of a container image. In some cases, the software function indicated by the master container node 62 corresponds to an operation to determine how to optimize motor use based on cost inputs. In some cases, the requested software function is associated with a processing operation to be performed on operational technology (OT) data associated with one or more industrial automation devices of the industrial automation system 10. In some cases, the industrial component is or includes a master container node 62 that coordinates operations of one or more worker container nodes 68.

At block 104, the container storefront 80 may query the storefront container registry 82 for the software function. When doing so, the container storefront 80 may be searching labels and/or file names of the respective external container images 84 and/or customer container images 86 to identify a subset of container images that may be related to or able to perform the desired software function. In some cases, the container storefront 80 searches metadata. In some systems, the container storefront 80 searches the container images based on one search term from a closed list of search terms. For example, a selected search term may be used when querying the container storefront 80. The container storefront 80 may process the request from the master container node 62 to determine which search terms to use to query the storefront container registry 82. In some cases, the selected search term may correspond to terms related to optimizing motor use based on cost inputs, such as "motor," "optimize," "cost analysis," "historical analysis," "real-time power consumption" or the like.

At block 106, the container storefront 80 may determine whether the query found one or more suitable containers to perform the software function. A container image may correspond to one or more containers. A container suitable to perform the software function may include software that, when executed, is able to perform the software function. If the container storefront 80 determines that there are not suitable containers to perform the software function, at block 108, the container storefront 80 may determine a set of software functions to be provided by containers available in the storefront container registry 82 associated with the requested software function. The container storefront 80 here may attempt to identify a combination of containers that together may perform the requested software function. To do so, the container storefront 80 may analyze software or code associated with the container image to determine what functions that container is able to cause. For example, the container storefront 80 may determine which combination of existing container images in the storefront container registry 82 may together determine how to optimize motor use based on cost inputs. An example set of container images may include a container image configurable to identify one or more motors of the industrial automation system 10, a container image configurable to identify power consumption of one or more motors of the industrial automation system 10, a container image configurable to consider power consumption over time of the one or more motors of the industrial automation system 10, a container image configurable to identify which one or more motors of the industrial automation system 10 to power off when based on historical power consumption data, or the like. A respective container image in the set of container images may generate data outputs based on data inputs from one or more other container images of the set of container images.

Based on what containers are identified at block 108, the container storefront 80 may, at block 110, send the set of software functions to the customer industrial automation system 10. The container storefront 80 may also transmit an indication of which combination of the containers are to perform which portion or subset of software function.

At block 112, the container storefront 80 may receive a selection of software function(s) from the set of software functions from the customer industrial automation system 10. That is, the master container node 62 may accept, adjust, or reject the proposed selection of software functions proposed by the container storefront as an alternative solution to the originally requested software function. The master container node 62 may reject the proposed selection by transmitting a termination indication or by not transmitting an indication back to the container storefront 80, which may cause the outstanding request for the container image(s) to expire when a threshold amount of time passes.

When accepted or adjusted, at block 114, the container storefront 80 may identify which of the container images 84, 86 stored in the storefront container registry 82 may correspond alone or together as a combination to the selected software functions. These selections then may correspond to which combination of available software functions are desired to replace the originally desired software function indicated via the request at block 102. For example, a first container and a second container together may perform different software functions that replicate an input-output behavior of a third software function actually requested by the master container node 62 and ultimately not saved as a single container image in the storefront container registry 82. Indeed, the accepted set of container images 84, 86 may together perform a software function to determine how to optimize motor use based on cost inputs.

Indeed, to summarize, before retrieving the first container image from the first container registry (e.g., at block 126), the container storefront 80 may determine a set of software functions that corresponds to the requested software function (e.g., block 108) and may determine a subset of container images of the one or more container images based on the set of software functions (e.g., block 108). Respective container images of the subset of container images may respectively correspond to respective software functions of the set of software functions. The container storefront 80 may send an indication of the subset of container images, the set of software functions, or both to the industrial component (e.g., block 110, block 116). The container storefront 80 may receive a selection of one or more container images of the subset of container images, one or more software functions of the set of software function, or both from the industrial component (e.g., block 112, block 118). Finally, the container storefront 80 may retrieve the first container image from the storefront container registry based on the selection (e.g., block 126), such as in response to determining that the first container image is compatible with a selected industrial component.

Referring back to block 106, if the container storefront 80 determines that there were suitable containers to perform the selected software function, the container storefront 80 may, at block 116, send a list of available software functions within the storefront container registry 82 to a requesting component, such as the master container node 62 (which may forward on to the requesting component). The list of available software functions may include some external container images 84 and some customer container images 86. The external container images 84 and/or the customer container images 86 that correspond to the selected software function may each correspond to instructions that cause a processor to perform the selected software function. At block 118, the container storefront 80 may receive a selection of the software function(s) from the master container node 62.

At block 120, the container storefront 80 receives an indication of an industrial component functionality and/or compatibility. The container storefront 80 may receive an indication that the at least one container image is incompatible with the industrial component, may identify an additional industrial component configured to execute the at least one container image (e.g., block 124), and may sending the at least one container image to the additional industrial component (e.g., block 126). To elaborate, the operations of block 120 may be performed following operations of block 114 or of block 118.

At block 122, the container storefront 80 may determine whether the container corresponding to the selected software function(s) is operable on the industrial component indicated at block 120. Indeed, the container storefront 80 may determine whether the industrial component is compatible with one or more container images selected at block 118 or block 114. The container storefront 80 may determine whether the industrial component is compatible with the first container image and may retrieve the first container image 84, 86 from the storefront container registry 82 (e.g., a first container registry) in response to determining that the industrial component is compatible with the first container image. The industrial component may correspond to the industrial component that is to host the container image(s) once deployed in the industrial automation system 10. The indication of the functionality and/or the compatibility may include an indication of an operating system and/or an operating system version number. The indication of the functionality and/or the compatibility may include a date of last update of software of the industrial component. The indication of the functionality and/or the compatibility may include an indication of how critical a process performed by the industrial component is to overall industrial automation system 10 operation. The indication of the functionality and/or the compatibility may include an indication of a status or current operational state of the industrial component. Other parameters may be included in the indication. The indication may be used to determine whether the industrial component is suitable and able to have a new container image deployed to it.

When the container storefront 80 determines, at block 122, that the container is not operable, the container storefront 80 may, at block 124, access OT network data and identify another component suitable for the container corresponding to the selected software functions. The container storefront 80 may access the OT network data using symbolic data access operations based on symbol and template data structures. Indeed, the container storefront 80 may search the OT network data to identify one or more industrial components that may suitably replace the component identified at block 120 to perform the desired software function from block 102. For example, the container storefront 80 may determine which motor control center to use to perform the desired motor optimization operation identified at block 102. In some cases, one or more industrial components may be identified and/or selected based on available computing resources, such as a number of available computing resources or a number of desired additional computing resources to perform an operation. Since the software function is associated with a processing operation to be performed on operational technology (OT) data associated with one or more industrial automation devices of the industrial automation system, other operating conditions or sensing data may be taken into account when determining whether a respective industrial automation device is suitable to host the container operation and/or execute operations corresponding to the container.

However, when at block 122 the container storefront 80 determines that the container corresponding to the selected software function(s) is operable on the industrial component indicated at block 120, the container storefront 80 may, at block 126, retrieve the suitable container from the storefront container registry 82. Operations from block 124 may also proceed to block 126. In this way, the container storefront 80 may retrieve at least one container image from the storefront container registry 82 in response to determining that the industrial component is compatible with the at least one container image. At block 126, the container storefront 80 may send the suitable container to the master container node 62 and/or to the container registry 26. The master container node 62 may deploy the suitable container image to the suitable industrial component in the industrial automation system 10. For example, for a software function associated with optimization motor operation based on costs, the master container node 62 may deploy the container image to a motor control system, which may aid in analysis performed via execution of the software function and in implementation of operations determined to be performed via execution of the software function.

At block 128, the container storefront 80 may receive an indication of a time period for a subscription between the container stored in the storefront container registry 82 and the customer industrial automation system 10, and further, at block 130, the container storefront 80 may receive an indication of payment information for the subscription from the customer industrial automation system 10. The container storefront 80 may facilitate obtaining the subscription and payment information after successful download of the container image to one or more devices of the OT space. After the download is completed, the container storefront 80 may generate an indication to be presented via the digital storefront, in which indication the OT space device used to access the digital storefront may transmit inputs corresponding to the subscription and payment information.

At block 132 and block 134, the container storefront 80 may receive and/or send periodic status updates from the industrial component during the time period. For example, the master container node 62 may query, repackage, and transmit status updates associated with operations of a motor control system when executing the container image to perform a software function to optimize motor performance based on costs. That is, the subscription time period may begin at download of the container image 84, 86 from the storefront container registry 82 and end at expiration of the time period. Once payment and subscription information is received, the container storefront 80 may access a download time of the container image and compare the subscription time period to the download time to manage a duration remaining of the subscription time period. During the subscription time period, updates may be exchanged between the container storefront and the master container node 62 related to updates to the container image that are to be deployed to the corresponding container image deployed in the OT space and/or related to updates to the industrial automation component that stores the container image 84, 86. The status of the industrial automation component may be used to monitor ongoing compatibility of the software function corresponding to the deployed container image with the current status of the industrial automation component. The container storefront 80 may receive subscription payment information and subscription time period information from the industrial automation system 10 and may receive periodic status updates associated with the industrial component during a time period corresponding to the subscription time period information. The container storefront 80 may send one or more updated container images to the industrial component during the time period, where the updated container image may include an adjusted container image relative to the first container image sent at block 126 (e.g., a software update implementing a change in a setting, parameter, or software function performed based on the container image). The container storefront 80 may stop sending updates to the industrial component after an end to the time period corresponding to the subscription time period information.

Indeed, the subscription time period may eventually expire. At block 136, the container storefront 80 may end the subscription or receive an indication to renew the subscription at the end of the time period. A time period before the expiration of the subscription time period, the container storefront 80 may send a request to the master container node 62 for the renewal of the subscription. In response to the expiration time, the container storefront 80 may end the subscription and/or transmit request to the master container node 62 for the renewal of the subscription. In response to the subscription ended, the container storefront 80 may transmit a removal control signal to the master container node 62. The removal control signal may cause the master container node 62 to remove the one or more container images from the industrial components previously deployed on in association with the subscription.

Technical effects of the systems and methods described herein include improving deployment of container images via a container storefront able to manage requests for container images from a master container node. The container storefront may consolidate both external container images and customer container images (e.g., container images generated by external customers in similar IDE to an IDE used by a target industrial automation system) in a storefront container registry. The container storefront may search the external container images and customer container images in response to a request for a container to perform a software function. These systems and methods may reduce a complexity associated with sharing container images between customer industrial automation control systems in a secure and efficient manner. Furthermore, these systems and methods may further improve industrial automation system operation by enabling outdated subscriptions to container images to be automatically removed based on communications between the container storefront and the master container node without input to a graphical user interface and/or the IDE for the industrial automation system. Moreover, these systems and methods may further improve industrial automation system operation by enabling subscribed container images to be automatically updated based on communications between the container storefront and the master container node without input to a graphical user interface and/or the IDE for the industrial automation system. These operations may help to ensure or increase a likelihood of up-to-date container images being implemented in the industrial automation system while reducing a burden on other computing and/or control operations to do so by dedicating the operations to the master container node and a subscription model.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   a container registry configured to store a plurality of container images; and
   a computing device configured to:
      receive a request from an industrial component operating in an industrial automation system, wherein the request comprises an indication of a requested software function;
      query the container registry based on the requested software function;
      in response to determining that the container registry lacks a container image for performing the requested software function, determine a set of software functions that correspond to performing the requested software functions;
      send an indication of the set of software functions to the industrial component;
      receiving a selection of the set of software functions;
      identify one or more container images of the plurality of container images that corresponds to the selection of the set of software functions;
      retrieve the one or more container images from the container registry; and
      send the one or more container images to the industrial component.

2. The system of claim 1, wherein the requested software function is associated with a processing operation to be performed on operational technology (OT) data associated with one or more industrial automation devices of the industrial automation system.

3. The system of claim 1, wherein the computing device is configured to:
   determine that the industrial component is compatible with the one or more container images; and
   retrieve the one or more container images from the container registry in response to determining that the industrial component is compatible with the one or more container images.

4. The system of claim 1, wherein the computing device is configured to:
   receive subscription payment information and subscription time period information from the industrial automation system; and
   receive periodic status updates associated with the industrial component during a time period corresponding to the subscription time period information.

5. The system of claim 4, wherein the computing device is configured to send an updated container image to the industrial component during the time period, wherein the updated container image comprises one or more adjusted container images relative to the one or more container images.

6. The system of claim 4, wherein the computing device is configured to stop sending updates to the industrial component after an end to the time period.

7. The system of claim 1, wherein the industrial component comprises a master container node configured to coordinate operations of one or more worker container nodes.

8. The system of claim 1, wherein the computing device comprises a container storefront device.

9. A method, comprising:
   receiving, via a processing system, a request from an industrial component operating in an industrial automation system, wherein the request comprises an indication of a requested software function;
   querying, via the processing system, a container registry comprising a plurality of container images based on the requested software function;
   in response to determining that the container registry lacks a container image for performing the requested software function, determining, via the processing system, a set of software functions that correspond to performing the requested software functions;

sending, via the processing system, an indication of the set of software functions to the industrial component;

receiving, via the processing system, a selection of the set of software functions;

identifying, via the processing system, one or more container images of the plurality of container images that corresponds to the selection of the set of software functions;

retrieving, via the processing system, the one or more container images from the container registry; and sending, via the processing system, the one or more container images to the industrial component.

10. The method of claim 9, wherein the one or more container images is sent to the industrial component based on available computing resources associated with the industrial component.

11. The method of claim 9, wherein the requested software function is associated with a processing operation to be performed on operational technology (OT) data associated with one or more industrial automation devices of the industrial automation system.

12. The method of claim 9, comprising:
determining that the industrial component is compatible with the one or more container images; and
retrieving the one or more container images from the container registry in response to determining that the industrial component is compatible with the one or more container images.

13. The method of claim 9, comprising:
receiving subscription time period information associated with the one or more container images; and
receiving periodic status updates associated with the one or more container images during a time period corresponding to the subscription time period information.

14. The method of claim 13, comprising sending one or more updated container images to the industrial component during the time period.

15. A non-transitory computer-readable medium comprising computer-executable instructions that, when executed, are configured to cause at least one processor to perform operations comprising:
receiving a request from an industrial component operating in an industrial automation system, wherein the request comprises an indication of a requested software function;
querying a container registry comprising a plurality of container images based on the requested software function;

in response to determining that the container registry lacks a container image for performing the requested software function, determining a set of software functions that correspond to performing the requested software functions;

sending an indication of the set of software functions to the industrial component;

receiving a selection of the set of software functions;

identifying one or more container images of the plurality of container images that corresponds to the selection of the set of software functions;

retrieving the one or more container images from the container registry; and sending the one or more container images to the industrial component.

16. The non-transitory computer-readable medium of claim 15, wherein the computer-executable instructions are configured to cause the at least one processor to perform the operations comprising:
receiving subscription time period information associated with the one or more container images; and
receiving periodic status updates associated with the one or more container images during a time period corresponding to the subscription time period information.

17. The non-transitory computer-readable medium of claim 16, wherein the computer-executable instructions are configured to cause the at least one processor to perform the operations comprising sending one or more updated container images to the industrial component during the time period.

18. The non-transitory computer-readable medium of claim 15, wherein the industrial component comprises a drive.

19. The non-transitory computer-readable medium of claim 15, wherein the requested software function is associated with a processing operation to be performed on operational technology (OT) data associated with one or more industrial automation devices of the industrial automation system.

20. The non-transitory computer-readable medium of claim 15, wherein the computer-executable instructions are configured to cause the at least one processor to perform the operations comprising:
determining that the industrial component is compatible with the one or more container images; and
retrieving the one or more container images from the container registry in response to determining that the industrial component is compatible with the one or more container images.

* * * * *